United States Patent [19]

Liff

[11] Patent Number: 4,640,226

[45] Date of Patent: Feb. 3, 1987

[54] BIRD WATERING APPARATUS

[76] Inventor: Walter H. Liff, P.O. Box 96, Newcastle, N.H. 03854

[21] Appl. No.: 790,507

[22] Filed: Oct. 23, 1985

Related U.S. Application Data

[63] Continuation-in-part of Ser. No. 662,365, Oct. 18, 1984.

[51] Int. Cl.⁴ ............................................. A01K 45/00
[52] U.S. Cl. ........................................ 119/1; 119/73
[58] Field of Search ..................... 119/1, 73; 219/436, 219/438

[56] References Cited

U.S. PATENT DOCUMENTS

| | | | |
|---|---|---|---|
| 2,427,444 | 9/1947 | Colombo | 219/438 |
| 3,064,112 | 11/1962 | Hanzel | 219/436 |
| 3,170,439 | 2/1965 | Juenger | 119/73 |
| 3,648,659 | 3/1972 | Jones | 119/1 |
| 3,806,701 | 4/1974 | Scott | 219/436 |
| 4,320,721 | 3/1982 | Silcox | 119/73 |

*Primary Examiner*—Hugh R. Chamblee
*Attorney, Agent, or Firm*—Thomas N. Tarrant

[57] ABSTRACT

A watering container for birds having spaced inner and outer walls integrally molded from plastic with electrical heating elements contacting the inner wall controlled so that energy is provided to the heating elements is progressively increased with the fall of ambient temperature below freezing.

6 Claims, 7 Drawing Figures

BIRD WATERING APPARATUS

CROSS-REFERENCE TO RELATED APPLICATIONS

This application is a continuation-in-part of prior application Ser. No. 662,365 filed Oct. 18, 1984 entitled Animal Watering Apparatus filed by the same applicant/inventor and unassigned.

BACKGROUND OF THE INVENTION

1. Field of the Invention

The present invention relates to watering devices for birds and in particular to such devices that maintain the water temperature above freezing.

2. Description of the Prior Art

A number of animal watering devices have been used over the years to provide large quantities of drinking water and to prevent that water from freezing. These devices have been designed primarily for use by either large farm animals or by animals bred in large numbers. While the emphasis of previous devices has been on keeping large quantities of water from freezing and has satisfied the needs of farmers and breeders, the devices have not been practical for the average pet owner or bird enthusiast. Small quantities of water, such as used in a garden birdbath, freeze much more readily and quickly making the problem greater.

Many wild birds stay in climates where water freezes during the winter and have a difficult time finding drinking and bathing water. These birds require a constant supply of water.

Previously, bird lovers only had one method for providing drinking water at below freezing temperatures. It was necessary to frequently monitor the birdbath and either break surface ice or add warm water at intervals. This is not convenient since most people's schedules do not provide time for this type of monitoring.

Temperature controlled heating vessels for cooking and other purposes are common. U.S. Pat. No. 3,806,701 describes a ceramic pot suitable for casseroles, cooking baked beans etc. It has outer and inner walls and a heating element secured to the outer surface of the inner wall.

U.S. Pat. No. 3,820,508 describes a device for maintaining water for horses above freezing. An outer container holds insulating material in which low voltage heating elements are disposed. A separate water container is removably placed inside the outer container to receive heat from the heating elements.

U.S. Pat. No. 3,852,566 describes the use of electrical heating compositions having temperature coefficients of resistivity.

U.S. Pat. No. 4,320,721 describes animal watering apparatus having inner and outer walls, insulation between the two walls and electrical heating elements in the insulation.

SUMMARY OF THE INVENTION

In accordance with the present invention, bird watering apparatus is provided having spaced inner and outer walls integrally molded with electrical heating elements in integral contact with the inner wall. Temperature sensitive controlling provides energy to the heating elements increasing progressively with decrease in ambient temperature.

Thus it is an object of the invention to provide a bird watering dish protected against freezing and economically manufacturable with a minimum of components. Further objects and features of the invention will become apparent upon reading the following description together with the drawing.

DESCRIPTION OF THE PREFERRED EMBODIMENTS

Figure 1:
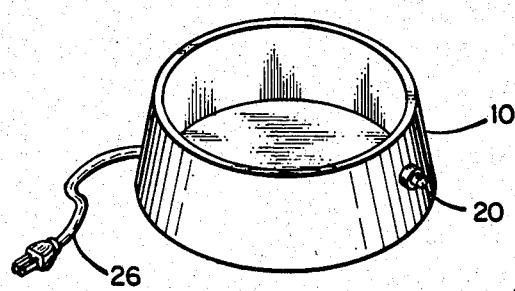
FIG. 1 is a view in projection of an animal watering dish.
Figure 2:
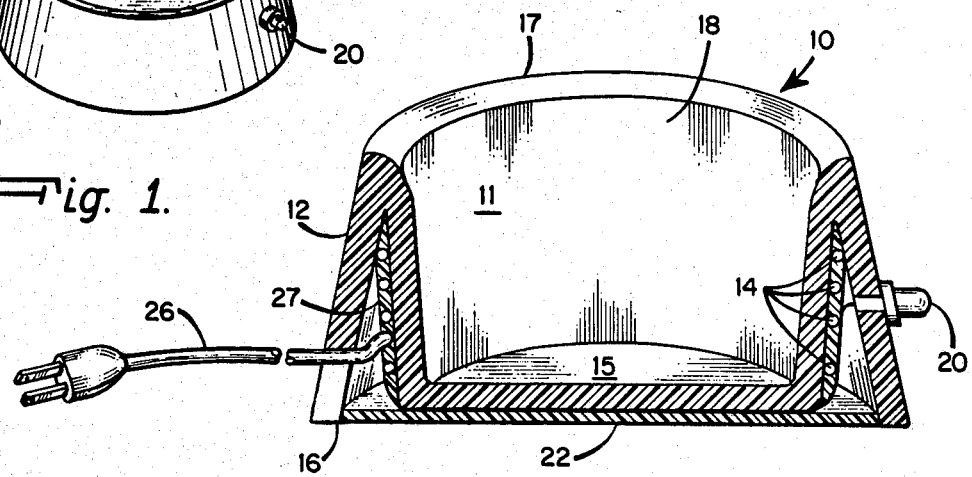
FIG. 2 is a cross section of FIG. 1.

It is a particular advantage of the present invention that most of the assembly is integrally molded in one operation. Watering device 10 is depicted in FIG. 1 in the form of a common design of dog dish. Referring to FIG. 2, it will be seen that both inner wall 11 and outer wall 12 are integral. Walls 11 and 12 are molded together in one step from polyurethane, polypropylene, polyethylene or similar plastic resin.

Figure 4:
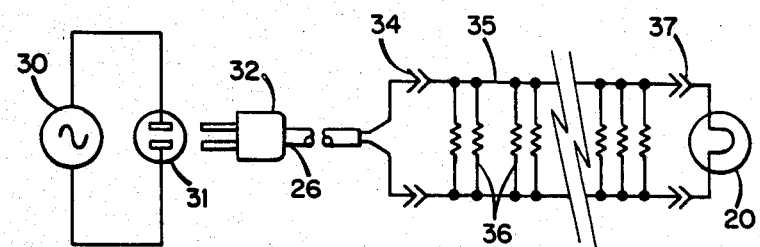
FIG. 4 is a schematic of an embodiment of the invention.

Electrical heating element 14 may be any of various types, but one type used for simplicity and safety is cable having a negative temperature coefficient of conductivity. Such cable is readily available from several sources and one of its common uses is as a pipe wrap to prevent freezing of piped liquids. Negative temperature coefficient of conductivity heating cable is depicted in FIG. 4 as cable 35 consisting of two conductive wires embedded in a resistive composition depicted by distributed shunt resistance 36. The resistive composition decreases in resistance as the temperature goes down increasing the current flow through the resistive composition. The power (and heat) dissipated by the resistive composition increases with increasing current flow. This type of cable is available to specified temperature characteristics and a suitable cable has been used that provides 4.5 watts per 30 cm at −18° C., 3.5 watts per 30 cm at 4.5° C. and 3 watts per 30 cm at 10° C. The length of cable used depends on the size of the dish and the amount of insulation if any. Two meters of cable has been used with a dish having a 23 cm diameter at the top rim. Thus the wattage at 10° C. is less than 1 watt per cm of dish diameter measured at the top rim.

The heat put out by element 14 is too low to damage the surrounding plastic. For safety, it is preferred to fuse the electrical line at an amperage slightly above the highest level expected.

Referring to FIG. 2, electrical element 14 is wrapped tightly around the outside of inner wall 11. After wrapping, element 14 is integrally bonded to wall 15 by coating with a polyester gel coat or other adhesive coating material 27. Coating material 27 is applied by brush, spray, dip or molding.

Inner wall 11 has closed bottom 15 and is integrally formed with outer wall 12. The thickness of the walls is not critical and depends primarily on the density of the plastic used. A thickness of 1 to 3 mm is suitable. Spaced outer wall 12 extends below bottom 15 to provide outer bottom rim 16. Inner wall 11 and outer wall 12 are integrally joined at top rim 17 leaving open top 18.

Figure 3:
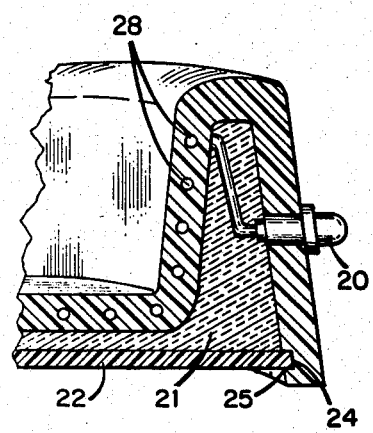
FIG. 3 is a partial cross section of FIG. 1 depicting a second embodiment of the invention.

While the invention has been found to perform well in the simple embodiment described above, more efficient operation can be obtained by filling the space between inner and outer walls 11 and 12 with insulation 21 as depicted in FIG. 3. Insulation 21 is suitably sprayed plastic foam, fiber glass or loose foam pellets. Other types of insulation can be used.

Panel 22 is a flat panel of rigid plastic or other fairly stiff material made to fit inside bottom rim 16. Annular recess 24 molded in the lower interior surface of outer wall 12 serves to secure panel 22. This arrangement requires some flexibility in wall 12 and/or panel 22 in order to snap panel 22 into place. Other common arrangements of tabs, slots, lips etc. may be utilized. Plastic weld 25 is preferred also for strength. Panel 22 forming a bottom closure together with insulation 21 reduces heat loss to a considerable extent.

Also depicted in FIG. 3 is an alternative arrangement in which heating element 14 is integrally molded inside wall 11. While this is considered a desirable embodiment, setup costs for commercial production are substantially higher than in the configuration of FIG. 2.

In both FIG. 2 and FIG. 3, indicator light 20 is mounted in wall 12 to provide visible indication of operability.

FIG. 4 depicts a suitable electrical arrangement. 115 volts house current is represented as ac source 30 connected to electrical receptacle 31. Plug 32 is connected to heating cable 35 through cord 26 and connections 34. Indicator light 20 is connected to the far end of cable 35 by connections 37. Distributed shunt resistors 36 represent the negative temperature coefficient of conductivity resistance material in the cable.

Figure 5:
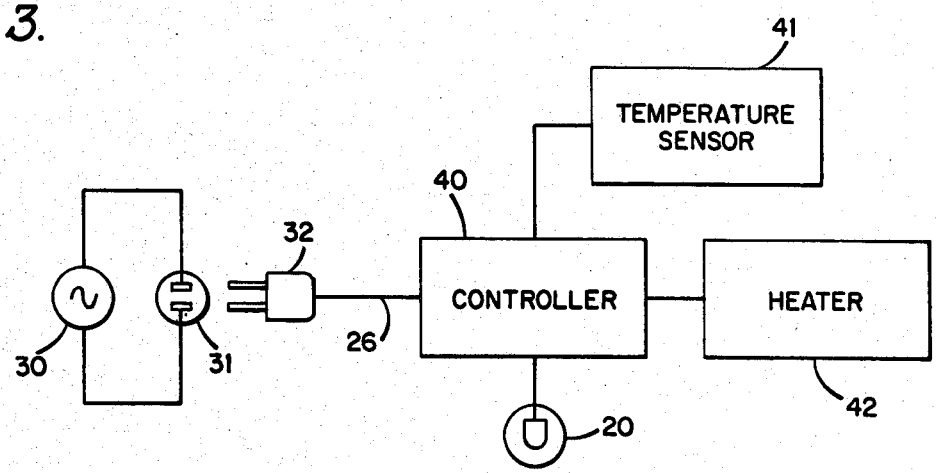
FIG. 5 is a generalized block diagram of the electrical configuration of the invention.

As an alternative to the temperature sensitive cable, a temperature sensing controller as depicted in FIG. 5 may be used. As shown in FIG. 5, controller 40 is connected to cord 26 and receives temperature input data from sensor 41. Conventional electrical heating elements are depicted by heater block 42. Indicator light 20 shown connected to controller 40 may be wired to show the state of the controller so that it only illuminates when the controller is providing power to heater 42. The variety of temperature sensing controllers available today is countless. Conventional thermostatic devices using compound bar temperature sensing elements can be used. Thermocouples, pn junctions, varistors and the like can be used with solenoid or electronic relays to turn current on and off with temperature. A temperature sensitive resistance element can control a voltage variable oscillator with a counted down output driving SCRs or triacs to turn power on and off at an appropriate rate to control temperature. Use of zener diodes or other threshold devices can set the commencement temperature at any desired point.

Both controller and temperature sensing element are preferably located between walls 11 and 12 for protection and to minimize packaging costs. The controller with or separate from the temperature sensor may alternatively be located at plug 32 or anywhere between receptacle 31 and dish 10.

Figure 6:
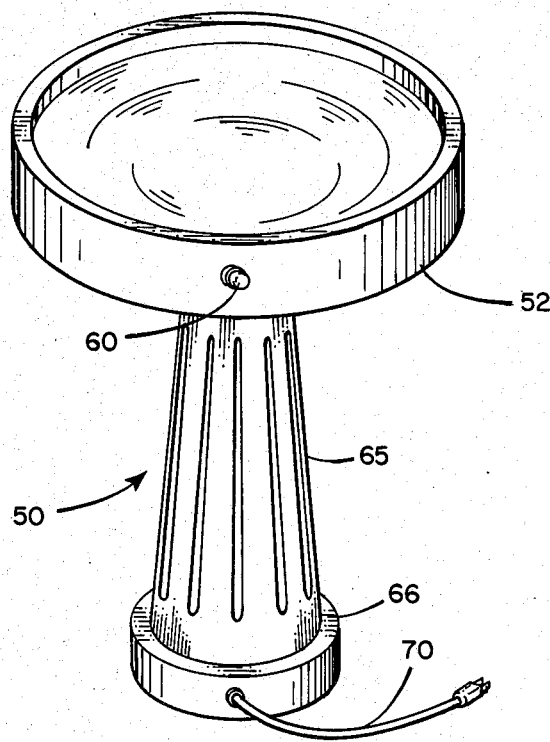
FIG. 6 is a view in projection of the inventive birdbath.
Figure 7:
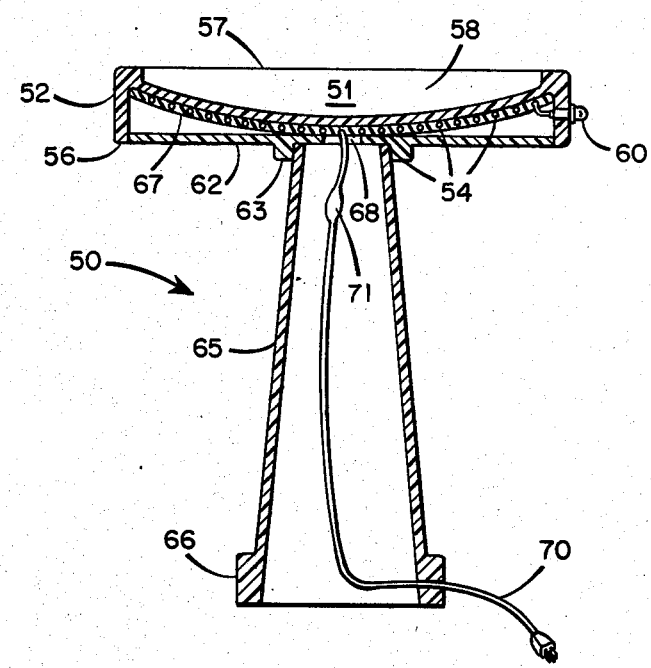
FIG. 7 is a cross section of the birdbath of FIG. 6.

FIG. 6 depicts birdbath 50 in accordance with the invention. Birdbath 50 has a basin made up of inner wall 51 (FIG. 7) and outer wall 52 made in the same manner as dish 10 of FIG. 1, but in the configuration of a birdbath basin. Indicator light 60 is secured in outer wall 52 similar to indicator light 20 in FIG. 1. Pedestal 65 is molded plastic having an integrally molded enlarged base 66 molded to have the appearance of a pedestal formed from clay, stone or concrete. Electric cord 70 extends through an aperture in base 66.

As in FIG. 2, heating element 54 is wound spirally in contact with the bottom surface of inner wall 51 and held in place by coating 67 of a adhesive coating material as previously described. Indicator light 60 is connected to element 54.

Bottom support 62 is a plastic disk heat-welded to bottom rim 56 of outer wall 52. Integrally molded with bottom support 62 is collar 63. Collar 63 is an annular collar extending downward to form a socket for receiving the top of pedestal 65. Central aperture 68 in bottom support 62 provides passage for an end of heating element 54 which connects to electric cord 70 at electrical connector 71. Birdbath 50 functions in the same manner as animal watering dish 10 and can be operated with the same circuitry.

Variations within the skill of the art are contemplated.

I claim:

1. A temperature controlled birdbath device comprising:
   (a) a molded plastic container having:
     (1) an inner wall defining a closed bottom, sidewalls and an open top;
     (2) an outer wall integrally joined to said inner wall at said top and extending below said closed bottom spaced outward of said inner wall to define an open bottom below said closed bottom;
   (b) an electrical resistance heating element wound in contact with the bottom surface said inner wall consisting of negative temperature coefficient of conductivity heating cable; and,
   (c) means to connect said heating element to a source of electrical energy, said heating element providing increasing electrical energy as the ambient temperature falls below the freezing temperature of water.

2. A temperature controlled birdbath device according to claim 1 wherein said heating element has a temperature coefficient of electrical conductivity that increases electrical conductivity progressively as temperature falls below freezing with a conductivity at 10° C. that provides less than 1 watt per centimeter of container diameter.

3. A temperature controlled birdbath device according to claim 1 wherein an indicator light is mounted in said outer wall and connected to said means to connect for indicating the state of operability of said controller.

4. A temperature controlled birdbath device according to claim 1 wherein the space between said inner and outer walls is filled with a thermally insulating material and a panel is secured to said open bottom providing a closure thereof.

5. A temperature controlled birdbath device according to claim 1 wherein said heating element is integrally molded inside said inner wall as part of the molding of said plastic container.

6. A temperature controlled birdbath device according to claim 1 wherein said heating element is in integral contact with said inner wall by wrapping and coating with a bonding material.

* * * * *